US008183183B2

(12) United States Patent
Li et al.

(10) Patent No.: US 8,183,183 B2
(45) Date of Patent: May 22, 2012

(54) METHOD OF TREATING A WELLBORE AT HIGH TEMPERATURE IN CONTACT WITH CARBON DIOXIDE

(75) Inventors: Leiming Li, Sugar Land, TX (US); Lijun Lin, Sugar Land, TX (US); Curtis L. Boney, Houston, TX (US); Michael D. Parris, Richmond, TX (US); Kevin W. England, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 14 days.

(21) Appl. No.: 12/821,851

(22) Filed: Jun. 23, 2010

(65) Prior Publication Data

US 2011/0319302 A1 Dec. 29, 2011

(51) Int. Cl.
*C09K 8/68* (2006.01)
*E21B 43/26* (2006.01)

(52) U.S. Cl. .............. 507/203; 166/305.1; 166/308.1; 166/308.5; 507/209; 507/211; 507/214; 507/215; 507/216; 507/268; 507/903; 507/904

(58) Field of Classification Search .............. 507/203, 507/209, 211, 214, 215, 216, 268, 903, 904; 166/305.1, 308.1, 308.5
See application file for complete search history.

(56) References Cited

U.S. PATENT DOCUMENTS

| | | | |
|---|---|---|---|
| 3,330,346 A | 7/1967 | Jacobs et al. | |
| 3,331,167 A | 7/1967 | Hoch | |
| 4,900,457 A | 2/1990 | Clarke-Sturman et al. | |
| 5,172,763 A | 12/1992 | Mohammadi et al. | |
| 5,203,834 A | 4/1993 | Hutchins et al. | |
| 5,310,002 A | 5/1994 | Blauch et al. | |
| 5,322,125 A | 6/1994 | Sydansk | |
| 5,346,008 A | 9/1994 | Sydansk | |
| 5,372,462 A | 12/1994 | Sydansk | |
| 5,462,390 A | 10/1995 | Sydansk | |
| 5,465,792 A | 11/1995 | Dawson et al. | |
| 5,486,312 A | 1/1996 | Sandiford et al. | |
| 5,495,891 A | 3/1996 | Sydansk | |
| 5,513,705 A | 5/1996 | Djabbarah et al. | |
| 5,617,920 A | 4/1997 | Dovan et al. | |
| 5,735,349 A | 4/1998 | Dawson et al. | |
| 5,834,406 A | 11/1998 | Sydansk | |
| 6,011,075 A | 1/2000 | Parris et al. | |
| 6,103,772 A | 8/2000 | Sydansk | |
| 6,268,314 B1 | 7/2001 | Hughes et al. | |
| 6,367,550 B1 | 4/2002 | Chatterji et al. | |
| 2004/0238169 A1 | 12/2004 | Todd et al. | |
| 2005/0124500 A1 | 6/2005 | Chen et al. | |
| 2006/0032636 A1 | 2/2006 | Lord et al. | |
| 2008/0039347 A1* | 2/2008 | Welton et al. | 507/213 |
| 2008/0081771 A1* | 4/2008 | Lin et al. | 507/202 |
| 2008/0234147 A1 | 9/2008 | Li et al. | |
| 2009/0181865 A1 | 7/2009 | Dessinges et al. | |

OTHER PUBLICATIONS

Holm, LW.—Foam Injection Test in the Siggins Field,Illinois—Journal of Petroleum Technology, Dec. 1970, pp. 1499-1506.
SPE 25168—Sydansk, R.D.—Polymer-Enhanced Foams Part 1: Laboratory Development and Evaluation. 1994 Society of Petroleum Engineers. SPE Advanced Technology Series, vol. 2, No. 2. pp. 150-159.
SPE25175—Sydansk, R.D.—Polymer Enhanced Foams Part 2: Propagation Through High-Permeability Sandpacks—1994 Society of Petroleum Engineers. SPE Advanced Technology Series, vol. 2, No. 2. pp. 160-166.
SPE24662—Miller, M.J., Fogler, S.—A Mechanistic Investigation of Waterflood Diversion Using Foamed Gels—SPE Production & Facilities, Feb. 1995. pp. 62-69.
SPE26653—Dovan, H.T, Hutchins, R.D.—New Polymer Technology for Water Control in Gas Wells—SPE Production & Facilities, Nov. 1994. Society of Petroleum Engineers 1994. pp. 280-286.
SPE30120—Seright, R.S., Liang, J.—A Comparison of Different Types of Blocking Agents—1995 Society of Petroleum Engineers, Inc. Presented at the European Formation Damage Conference held in The Hague, The Netherlands, May 15-16, 1995.
SPE36616—Thach, S. Miller, K.C., Lai, Q.J., Sanders, G.S., Styler, J.W., and Lane, R.H.—Matrix Gas Shut-off in Hydraulically Fractured Wells Using Polymer-Foams—1996 Society of Petroleum Engineers, Inc. Presented at the 1996 SPE Annual Technical Conference and Exhibition held in Denver, Colorado, USA Oct. 6-9, 1996.
SPE37762—El-Hadid, S.M., Falade, G.K., Dabbouk, C., and Al-Ansari, F.—Water Injection Profile Modification in a Layered Reservoir Using Polymer Treatment. 1997 Society of Petroleum Engineers. Presented at the Middle East Oil Show and Conference held in Manama Bahrain, Mar. 15-18, 1997.
SPE38837—Friedmann, F., Hughes, T.L., Smith, M.E., Hild, G.P., Wilson, A., Davies, S.N.,—Development and Testing of a New Foam-Gel Technology to Improve Conformance of the Rangely CO2 Flood—1997 Society of Petroleum Engineers, Inc. Presented at the 1997 SPE Annual Technical Conference and Exhibition held in San Antonio, Texas, Oct. 5-8, 1997.

(Continued)

*Primary Examiner* — Timothy J. Kugel
(74) *Attorney, Agent, or Firm* — Robin Nava; Daryl Wright; Jeremy Tillman

(57) ABSTRACT

A method for treating a subterranean formation is made of steps of providing a composition comprising a carrier fluid, a polymer viscosifying agent, carbon dioxide and a formate salt or formic acid; injecting into a wellbore, the composition; contacting the composition with the subterranean formation, wherein the temperature is above 100 degrees Celsius at this contact; and allowing the composition to treat the subterranean formation.

25 Claims, 3 Drawing Sheets

OTHER PUBLICATIONS

SPE39649—Hughes, T.L., Friedmann, F., Johnson, D., Hild, G.P. Wilson, A., and Davies, S.N.—Large-Volume Foam-Gel Treatments to Improve Conformance of the Rangely CO2 Flood—1998 Society of Petroleum Engineers, Inc. Presented at the 1998 SPE/DOE Eleventh Symposium on Improved Oil Recovery held in Tulsa, Oklahoma, Apr. 19-22, 1998.

SPE39654—Lakatos, I., Lakatos-Szabo, J., Kosztin, B and Palasthy, G.—Restriction of Gas Coning by a Novel Gel/Foam Technique—1998 SPE/DOE Improved Oil Recovery Symposium held in Tulsa, Oklahoma, Apr. 19-22, 1998. 1998 Society of Petroleum Engineers, Inc.

SPE54429 (revised from SPE38837)—Friedmann, F., Hughes, T.L., Smith, M.E., Hild, G.P., Wilson, A., Davies, S.N.—Development and Testing of a Foam-Gel Technology to Improve Conformance of the Rangely CO2 Flood. 1999 Society of Petroleum Engineers. First presented at the 1997 SPE Annual Technical Conference and Exhibition, San Antonio, Oct. 5-8, 1997.

SPE59283—Wassmuth, F.R., Hodgins, L.H., Schramm, L.L., Kutay, S.M.—Screening and Coreflood Testing of Gel Foams to Control Excessive Gas Production in Oil Wells. 2000 Society of Petroleum Engineers, Inc. Presented at the 2000 SPE/DOE Improved Oil Recovery Symposium held in Tulsa, Oklahoma, Apr. 3-5, 2000.

SPE72096—(revised from paper SPE 59283) Wassmuth, F.R., Hodgins, L.A., and Kutay, S.M.—Screening and Coreflood Testing of Gel Foams to Control Excessive Gas Production Oil Wells—2001 Society of Petroleum Engineers.

SPE89403—Wassmuth, F., Green, K., Hodgins, L.—Water Shut-off in Gas Wells: Proper Gel Placements is the Key to Success. 2004 Society of Petroleum Engineers. Presented at the 2004 SPE/DOE Fourteenth Symposium on Improved Oil Recovery held in Tulsa, Oklahoma USA Apr. 17-21, 2004.

SPE89388—Romero, L and Kantzas, A.—The Effect of Wettability and Pore Geometry on Foamed Gel Blockage Performance in Gas and Water Producing Zones. 2004 Society of Petroleum Engineers Inc. Presented at the 2004 SPE/DOE Fourteenth Symposium on Improved Oil Recovery held in Tulsa, Oklahoma USA Apr. 17-21, 2004.

Schlumberger Docket 56.1380—U.S. Appl. No. 12/821,881, filed Jun. 23, 2010. Titled: Gelation Acceleration. Inventors: Leiming Li et al.

Schlumberger Docket 56.1391—U.S. Appl. No. 12/823,410, filed Jun. 25, 2010. Titled:Gelled Foam Compositions and Methods. Inventors: Miquilena et al.

International Search Report mailed on Mar. 19, 2012 in the corresponding PCT application PCT/IB2011/052420 filed on Jun. 1, 2011.

\* cited by examiner

METHOD OF TREATING A WELLBORE AT HIGH TEMPERATURE IN CONTACT WITH CARBON DIOXIDE

FIELD OF THE INVENTION

This invention relates generally to the art of making and using oilfield treatment in severe environments. More particularly it relates to methods of using fluids for environments at high temperature in contact with carbon dioxide and especially to methods of using such fluids in fracturing fluids in a well from which oil and/or gas can be produced.

BACKGROUND

The statements in this section merely provide background information related to the present disclosure and may not constitute prior art.

In typical wellbore operations, various treatment fluids may be pumped into the well and eventually into the formation to restore or enhance the productivity of the well. For example, a reactive or non-reactive "fracturing fluid" or a "frac fluid" may be pumped into the wellbore to initiate and propagate fractures in the formation thus providing flow channels to facilitate movement of the hydrocarbons to the wellbore so that the hydrocarbons may be pumped from the well. In such fracturing operations, the fracturing fluid is hydraulically injected into a wellbore penetrating the subterranean formation and is forced against the formation strata by pressure. The formation strata are forced to crack and fracture, and a proppant is placed in the fracture by movement of a viscous-fluid containing proppant into the crack in the rock. The resulting fracture, with proppant in place, provides improved flow of the recoverable fluid (i.e., oil, gas or water) into the wellbore. In another example, a reactive stimulation fluid or "acid" may be injected into the formation. Acidizing treatment of the formation results in dissolving materials in the pore spaces of the formation to enhance production flow. It is common in all these types of operations to add further chemical components to treat the formation. In the case of proppant, scale inhibitors, filter cake remover, surfactant, gas hydrate inhibitors and other chemicals may be used.

Viscosifying agent based on polymer gels have been widely used for fracturing operations. However, none of said methods allows guar or guar derivative-based frac fluids when foamed or energized with $CO_2$ to be used at elevated temperatures due to the low pH caused by $CO_2$. The applicants found that some salt can be used with guar or guar derivatives to be usable at elevated temperatures.

SUMMARY

In a first aspect, a method is disclosed. The method comprises the step of providing a composition comprising a carrier fluid, a polymer viscosifying agent, and a formate ion compound; contacting the composition with carbon dioxide; and allowing the composition to be at a temperature above 100 degrees Celsius.

In a second aspect, a method of treating a subterranean formation from a wellbore is disclosed. The method comprises the step of providing a composition comprising a carrier fluid, a polymer viscosifying agent, carbon dioxide and a formate ion compound; injecting into a wellbore, the composition; contacting the composition with the subterranean formation, wherein the temperature is above 100 degrees Celsius at this contact; and allowing the composition to treat the subterranean formation.

In a third aspect, a composition is disclosed. The composition comprises a carrier fluid, a polymer viscosifying agent, carbon dioxide and a formate ion compound, wherein the carbon dioxide is present with a foam quality of from about 25% to about 80%.

DETAILED DESCRIPTION

Figure 1:
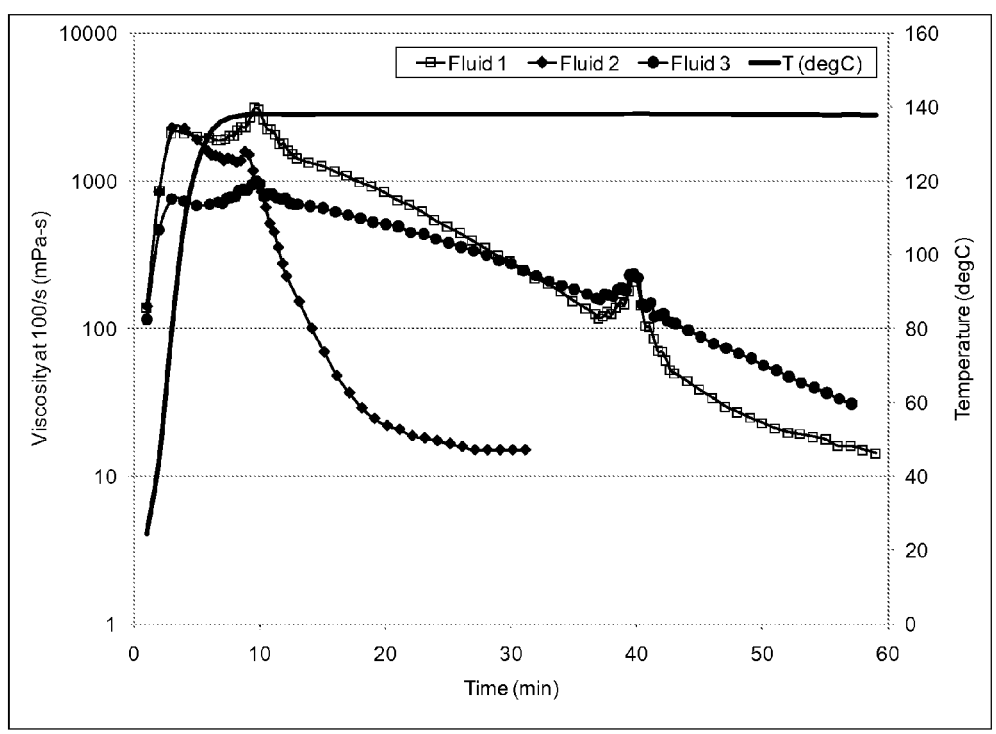
FIG. 1 is a graph comparing viscosity over time at about 280° F. (138° C.) for Fluid 1 in 400 psi $N_2$, for Fluid 2 in 400 psi $CO_2$, and for Fluid 3 containing 11% potassium formate in 400 psi $CO_2$, respectively.

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

As used herewith the term "gel" means a substance selected from the group consisting of (a) colloids in which the dispersed phase has combined with the continuous phase to produce a viscous, jelly-like product, (b) crosslinked polymers, and (c) mixtures thereof.

According to a first embodiment, the composition comprises a carrier fluid, a polymer viscosifying agent, carbon dioxide and a formate ion compound.

The carrier fluid may be any liquid in which the crosslinkable polymer and crosslinking agent can be dissolved, mixed, suspended or otherwise dispersed to facilitate gel formation. The carrier fluid may be fresh water, an aqueous composition, brine, and/or may include a brine. Also the carrier fluid may be an oil-based fluid including a gelled, foamed, or otherwise viscosified oil.

The fluid composition can be foamed or energized with carbon dioxide in a separate phase, for example with a foam quality of from about 25% to about 80%. The foam quality is the fraction of the non-aqueous phase. The fluid composition can also be in equilibrium with the carbon dioxide atmosphere at a pressure from above 0 psi to about 400 psi or higher.

The formate ion compound may be a formate salt or a formic acid. The formate ion compound may be present in concentration varying from below 0.1% to above 15% bw. When the formate ion compound is a formate salt, it may be present as a potassium formate, sodium formate, or other formates, or the combination.

The composition can further comprise an ion compound selected from the group consisting of: sulfite, oxalate, phosphate, ascorbate, and the combination thereof.

The polymer viscosifying agent may be hydratable gels (e.g. guars, poly-saccharides, xanthan, diutan, hydroxyethyl-cellulose, etc.), a cross-linked hydratable gel. The polymer viscosifying agent may be a crosslinkable polymer and a crosslinking agent capable of crosslinking the polymer.

A crosslinked polymer is generally formed by reacting or contacting proper proportions of the crosslinkable polymer with the crosslinking agent. However, the gel-forming composition need only contain either the crosslinkable polymer or the crosslinking agent. When the crosslinkable polymer or crosslinking agent is omitted from the composition, the omitted material is usually introduced into the subterranean formation as a separate slug, either before, after, or simultaneously with the introduction of the gel-forming composition. The composition may comprise at least the crosslinkable polymer or monomers capable of polymerizing to form a crosslinkable polymer. In another embodiment, the composition comprises both (a) the crosslinking agent and (b) either (i) the crosslinkable polymer or (ii) the polymerizable monomers capable of forming a crosslinkable polymer.

Embodiments of crosslinkable polymer include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other embodiments of crosslinkable polymer include polyvinyl polymers, polymethacrylamides, cellulose ethers, lignosulfonates, and ammonium, alkali metal, and alkaline earth salts thereof. More specific examples of other polymers are acrylamide polymers and copolymers, acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, other galactomannans, heteropolysaccharides obtained by the fermentation of starch-derived sugar (e.g., xanthan gum), diutan, and ammonium and alkali metal salts thereof.

Cellulose derivatives are also used in an embodiment, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently unless they can be used at lower concentrations.

The crosslinkable polymer is available in several forms such as a water solution or broth, a gel log solution, a dried powder, and a hydrocarbon emulsion or dispersion. As is well known to those skilled in the art, different types of equipment are employed to handle these different forms of crosslinkable polymers.

Other type of crosslinking agents may include organic and inorganic compounds well known to those skilled in the art. Exemplary organic crosslinking agents include, but are not limited to, aldehydes, dialdehydes, phenols, substituted phenols, hexamethylenetetramine and ethers. Phenol, phenyl acetate, resorcinol, glutaraldehyde, catechol, hydroquinone, gallic acid, pyrogallol, phloroglucinol, formaldehyde, and divinylether are some of the more typical organic crosslinking agents. Typical inorganic crosslinking agents are polyvalent metals as disclosed previously, chelated polyvalent metals, and compounds capable of yielding polyvalent metals.

According to a further embodiment, the composition may comprise a surfactant. Surfactants may be used to reduce the surface tension between the solvent and the gas. The surfactants may be water-soluble and have sufficient foaming ability to enable the composition, when traversed by a gas, to foam and, upon curing, form a foamed gel. Typically, the surfactant is used in a concentration of up to about 10, about 0.01 to about 5, about 0.05 to about 3, or about 0.1 to about 2 weight percent.

The surfactant may be substantially any conventional anionic, cationic or nonionic surfactant. Anionic, cationic and nonionic surfactants are well known in general and are commercially available. Exemplary surfactants include, but are not limited to, alkyl polyethylene oxide sulfates, alkyl alkylolamine sulfates, modified ether alcohol sulfate sodium salt, sodium lauryl sulfate, perfluoroalkanoic acids and salts having about 3 to about 24 carbon atoms per molecule (e.g., perfluorooctanoic acid, perfluoropropanoic acid, and perfluorononanoic acid), modified fatty alkylolamides, polyoxyethylene alkyl aryl ethers, octylphenoxyethanol, ethanolated alkyl guanidine-amine complexes, condensation of hydrogenated tallow amide and ethylene oxide, ethylene cyclomido 1-lauryl, 2-hydroxy, ethylene sodium alcoholate, methylene sodium carboxylate, alkyl arylsulfonates, sodium alkyl naphthalene sulfonate, sodium hydrocarbon sulfonates, petroleum sulfonates, sodium linear alkyl aryl sulfonates, alpha olefin sulfonates, condensation product of propylene oxide with ethylene oxide, sodium salt of sulfated fatty alcohols, octylphenoxy polyethoxy ethanol, sorbitan monolaurate, sorbitan monopalmitate, sorbitan trioleate, polyoxyethylene sorbitan tristearate, polyoxyethylene sorbitan tristearate, polyoxyethylene sorbitan monooleate, dioctyl sodium sulfosuccinate, modified phthalic glycerol alkyl resin, octylphenoxy polyethoxy ethanol, acetylphenoxy polyethoxy ethanol, dimethyl didodecenyl ammonium chloride, methyl trioctenyl ammonium iodide, sodium tridecyl ether sulfate, trimethyl decenyl ammonium chloride, and dibutyl dihexadecenyl ammonium chloride.

According to a further embodiment, another foaming gas may be present. The foaming gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), and nitrogen.

The amount of gas injected (when measured at the temperature and pressure conditions in the subterranean formation being treated) is generally about 1 to about 99 volume percent based upon the total volume of treatment fluids injected into the subterranean formation (i.e., the sum of the volume of injected gas plus the volume of injected foamable, gel-forming composition).

According to a further embodiment, the composition may further comprise proppant. Any conventional proppant (gravel) can be used. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The viscosified proppant slurry can be designed for either homogeneous or heterogeneous proppant placement in the fracture, as known in the art.

According to a further embodiment, the composition may further comprise additives as breakers, anti-oxidants, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, fluid loss agents, water blocking agents, EOR enhancing agents, or the like. The additive may also be a biological agent.

The fluid may be used, for example in oilfield treatments. The fluids may also be used in other industries, such as in household and industrial cleaners, agricultural chemicals, personal hygiene products, cosmetics, pharmaceuticals, printing and in other fields.

The fluid may be used for carrying out a variety of subterranean treatments, where a viscosified treatment fluid may be used, including, but not limited to, drilling operations, fracturing treatments, and completion operations (e.g., gravel packing). In some embodiments, the fluid may be used in treating a portion of a subterranean formation. In certain embodiments, the fluid may be introduced into a well bore that penetrates the subterranean formation. Optionally, the fluid further may comprise particulates and other additives suitable for treating the subterranean formation. For example, the fluid may be allowed to contact the subterranean formation for a period of time sufficient to reduce the viscosity of the treatment fluid. In some embodiments, the fluid may be allowed to contact hydrocarbons, formations fluids, and/or subsequently injected treatment fluids, thereby reducing the viscosity of the treatment fluid. After a chosen time, the fluid may be recovered through the well bore.

Accordingly, the composition fluid is especially suitable for downhole application in high temperatures above 212° F. (100° C.), or above 250° F. (121° C.), or above 270° F. (132° C.) or even above 280° F. (138° C.).

The fluids are also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

To facilitate a better understanding of some embodiments, the following examples of embodiments are given. In no way should the following examples be read to limit, or define, the scope of the embodiments described herewith.

EXAMPLES

Series of experiments were conducted to demonstrate properties of compositions and methods as disclosed above.
Example 1
Prior Art In a first example, a fluid according to prior art is prepared. The Fluid 1 was prepared with tap water, 0.1% tetramethyl ammonium chloride, 0.6% carboxymethyl hydroxypropyl guar (CMHPG), 0.036% sodium bicarbonate, and 0.12% sodium thiosulfate pentahydrate. The fluid pH was adjusted to about 5 with acetic acid, and then about 0.04% sodium zirconium lactate was added as the crosslinker. The gel pH was about 5.2. The viscosity at 138° C. (280° F.) was measured with a Fann50-type viscometer, following the API RP 39 schedule. The viscometer was connected to a gas cylinder, and the gas type and gas pressure could be selected for the fluid tested in the viscometer. In one case, the gel was tested in the 400 psi nitrogen ($N_2$) atmosphere. In another case, the same gel was tested in the 400 psi carbon dioxide ($CO_2$) atmosphere. The gel viscosity stayed above 100 cP (at the shear rate of 100/s) for about 41 minutes in $N_2$, while the gel viscosity stayed above 100 cP for only about 14 minutes in $CO_2$. The comparison between the 2 cases clearly shows that $CO_2$ could damage the gel at high temperatures. The damage could be caused by the $CO_2$ in the gel that lowered the fluid pH. Guar and guar derivative-based gels can be damaged by low pH, especially at elevated temperatures. When 2.5 atm (about 37 psi) $CO_2$ is dissolved in water, the pH drops to about 3.7. When 10 atm (about 147 psi) $CO_2$ is dissolved in water, the pH drops to about 3.4. In the tests shown here, the $CO_2$ pressure was about 400 psi.

Example 2

In this example, Fluid 1 was prepared with tap water, 0.1% tetramethyl ammonium chloride, 0.6% CMHPG, 0.036% sodium bicarbonate, and 0.12% sodium thiosulfate pentahydrate. The fluid pH was adjusted to about 5 with acetic acid, and then about 0.04% sodium zirconium lactate was added as the crosslinker. The gel pH was about 5.2. The viscosity at 138° C. (280° F.) was measured with a Fann50-type viscometer, following the API RP 39 schedule. The viscosity of Fluid 1 was measured in about 400 psi $N_2$ atmosphere. Fluid 2 was similarly prepared as Fluid 1, and the gel was measured in about 400 psi $CO_2$ atmosphere. Fluid 3 was similarly prepared as Fluid 1, but with about 11% (wt) potassium formate mixed and dissolved in the fluid, and Fluid 3 was measured in about 400 psi $CO_2$ atmosphere. The viscosity curves are shown in FIG. 1. Fluid 1 gel viscosity stayed above 100 cP (at 100/s) for about 41 minutes in $N_2$, while Fluid 2 viscosity stayed above 100 cP for only about 14 minutes in $CO_2$. With 11% potassium formate in Fluid 3, the gel viscosity stayed above 100 cP for about 43 minutes in $CO_2$, comparable to Fluid 1 (without potassium formate) in $N_2$. The comparison among the above 3 fluids clearly shows that formate protects the fluid from the $CO_2$ damage at high temperatures.

Example 3

Figure 2:
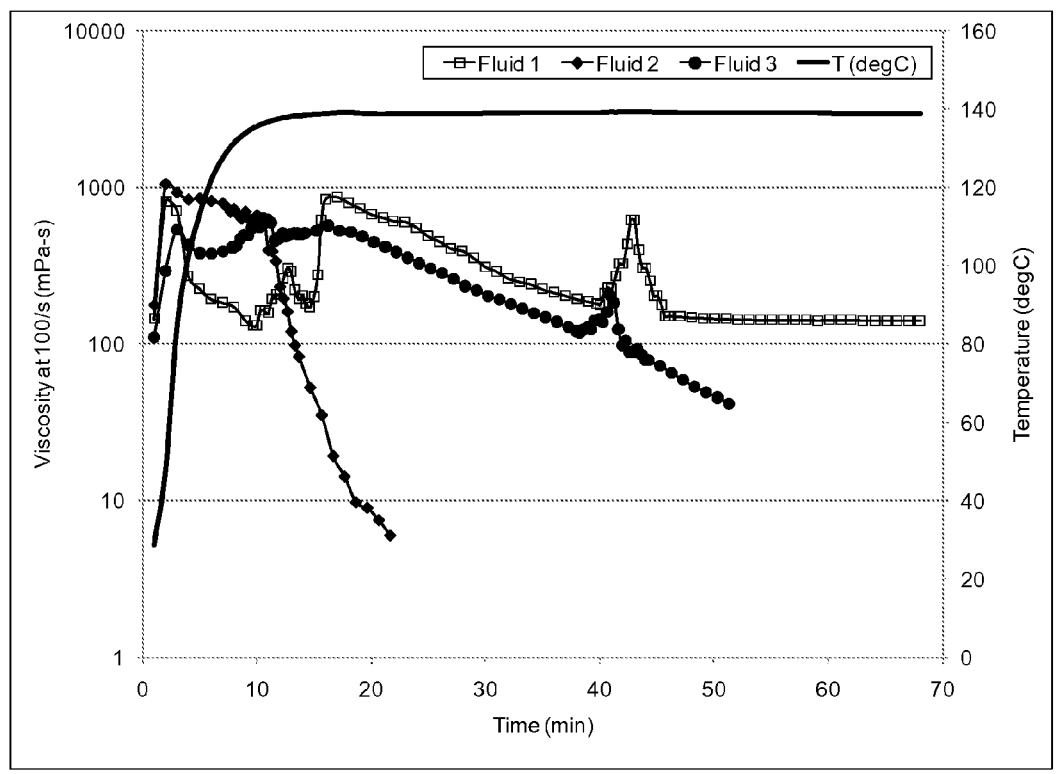
FIG. 2 is a graph comparing viscosity over time at about 280° F. (138° C.) for Fluid 1 in 400 psi $N_2$, for Fluid 2 in 400 psi $CO_2$, and for Fluid 3 containing 11% potassium formate in 400 psi $CO_2$, respectively (all fluids contained 2% KCl).

In this example, the fluid with dual salts (for example, with both formate and KCl) is tested. Fluid 1 was prepared with tap water, 2% KCl, 0.1% tetramethyl ammonium chloride, 0.6% CMHPG, 0.036% sodium bicarbonate, and 0.12% sodium thiosulfate pentahydrate. The fluid pH was adjusted to about 5 with acetic acid, and then about 0.04% sodium zirconium lactate was added as the crosslinker. The gel pH was about 5.2. The viscosity at 138° C. (280° F.) was measured with a Fann50-type viscometer, following the API RP 39 schedule. Fluid 1 was measured in about 400 psi $N_2$ atmosphere. Fluid 2 was similarly prepared as Fluid 1, and the gel was measured in about 400 psi $CO_2$ atmosphere. Fluid 3 was similarly prepared as Fluid 1, but with about 11% (wt) potassium formate mixed and dissolved in the fluid, and Fluid 3 was measured in about 400 psi $CO_2$ atmosphere. The viscosity curves are shown in FIG. 2. Fluid 1 gel viscosity stayed above 100 cP (at 100/s) for over 60 minutes in $N_2$, while the gel viscosity of Fluid 2 stayed above 100 cP for only about 13 minutes in $CO_2$. With 11% potassium formate in Fluid 3, the gel viscosity stayed above 100 cP for about 42 minutes in $CO_2$, comparable to Fluid 1 (without potassium formate) in $N_2$. The comparison among the above 3 cases again shows that formate could protect the fluid from the $CO_2$ damage at high temperatures.

Example 4

Figure 3:
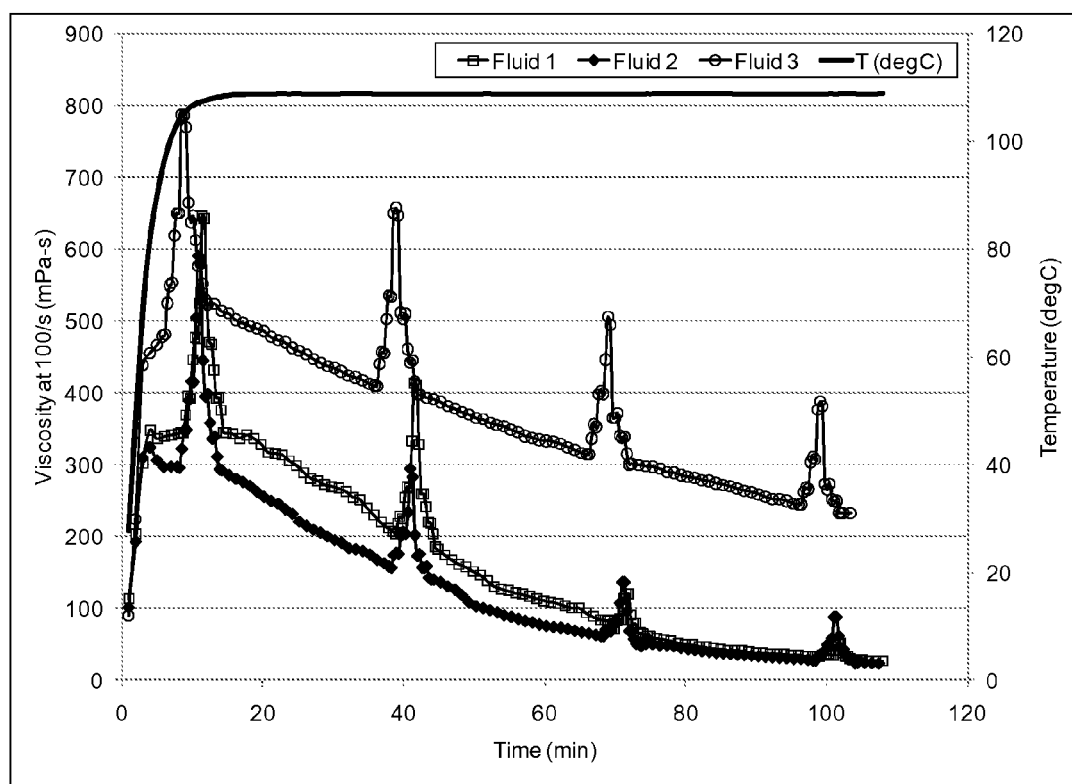
FIG. 3 is a graph comparing viscosity over time at about 225° F. (107° C.) for Fluid 1 in 400 psi $N_2$, for Fluid 2 in 400 psi $CO_2$, and for Fluid 3 containing 11% potassium formate in 400 psi $CO_2$, respectively (all fluids contained 2% KCl).

In this example, the formate salt is tested with another viscosifying agent/crosslinker. Fluid 1 was prepared with lab water, 2% KCl, 0.6% guar, 0.12% sodium bicarbonate, 0.24% sodium thiosulfate pentahydrate, 0.2% acetic acid, 0.04% glycolic acid, and 0.08% triethanolamine titanate (the crosslinker). The gel pH was about 4.5. The viscosity at 107° C. (225° F.) was measured with a Fann50-type viscometer, following the API RP 39 schedule. Fluid 1 was measured in about 400 psi $N_2$ atmosphere. Fluid 2 was similarly prepared as Fluid 1, and was measured in about 400 psi $CO_2$ atmosphere. Fluid 3 was similarly prepared as Fluid 1, but with about 11% (wt) potassium formate mixed and dissolved in the fluid, and Fluid 3 was measured in about 400 psi $CO_2$ atmosphere. The viscosity curves are shown in FIG. 3. The viscosity of Fluid 1 stayed above 100 cP (at 100/s) for about 65 minutes in $N_2$, while the viscosity of Fluid 2 stayed above 100 cP for about 50 minutes in $CO_2$. With 11% potassium formate in Fluid 3, the gel viscosity stayed above 100 cP for over 2 hours in $CO_2$ with enhanced viscosity values. The comparison among the above 3 fluids shows that formate protects Fluid 3 from the $CO_2$ damage at high temperatures.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope of the embodiments described herewith. Accordingly, the protection sought herein is as set forth in the claims below.

What is claimed is:

1. A method comprising:
    a. providing a composition comprising a carrier fluid, a polymer viscosifying agent, and a formate ion compound;
    b. contacting the composition with carbon dioxide; and
    c. allowing the composition to be at a temperature above 100° C.,
    wherein a viscosity of the contacted composition is maintained above 100 cP for at least about 42 minutes.

2. The method of claim 1, wherein the polymer viscosifying agent is a crosslinkable polymer and a crosslinking agent capable of crosslinking the polymer.

3. The method of claim 2, wherein the crosslinkable polymer is water-soluble polysaccharide.

4. The method of claim 3, wherein the crosslinkable polymer is guar or guar derivative.

5. The method of claim 1, wherein the formate ion compound is formic acid or formate salt.

6. The method of claim 5, wherein the formate salt is potassium formate or sodium formate.

7. The method of claim 1, wherein the carrier fluid is water or brine.

8. The method of claim 1, wherein the crosslinkable polymer is selected from the group consisting of guar, hydroxypropyl guar (HPG), carboxymethylhydroxypropyl guar (CMHPG) and carboxymethyl guar (CMG), hydrophobically modified guars, guar-containing compounds, synthetic polymers and combinations thereof.

9. The method of claim 1, further comprising an ion compound selected from the group consisting of: sulfite, oxalate, phosphate, ascorbate, and the combination thereof.

10. The method of claim 1, wherein the composition further comprises a foaming agent.

11. The method of claim 1, wherein the step of contacting the composition with carbon dioxide is made by foaming the composition with carbon dioxide.

12. The method of claim 1, wherein the step of contacting the composition with carbon dioxide is made by injecting the composition in a wellbore wherein carbon dioxide is present.

13. The method of claim 1, wherein the temperature is above 120 degrees Celsius.

14. The method of claim 1, wherein the temperature is above 130 degrees Celsius.

15. A method of treating a subterranean formation comprising:
   a. providing a composition comprising a carrier fluid, a polymer viscosifying agent, carbon dioxide and a formate ion compound;
   b. injecting into a wellbore, the composition;
   c. contacting the composition with the subterranean formation, wherein the temperature is above 100 degrees Celsius at this contact; and
   d. allowing the composition to treat the subterranean formation,
   wherein a viscosity of the contacted composition is maintained above 100 cP for at least about 42 minutes.

16. The method of claim 15, wherein the polymer viscosifying agent is a crosslinkable polymer and a crosslinking agent capable of crosslinking the polymer.

17. The method of claim 16, wherein the crosslinkable polymer is guar or guar derivative.

18. The method of claim 15, wherein the formate ion compound is formic acid or formate salt.

19. The method of claim 18, wherein the formate salt is potassium formate or sodium formate.

20. The method of claim 15, wherein the crosslinkable polymer is selected from the group consisting of guar, hydroxypropyl guar (HPG), carboxymethylhydroxypropyl guar (CMHPG) and carboxymethyl guar (CMG), hydrophobically modified guars, guar-containing compounds, synthetic polymers and combinations thereof.

21. The method of claim 15, wherein the carbon dioxide is present with a foam quality of from about 25 to about 80%.

22. The method of claim 15, wherein the carrier fluid is water or brine.

23. The method of claim 15, further comprising an ion compound selected from the group consisting of: sulfite, oxalate, phosphate, ascorbate, and the combination thereof.

24. The method of claim 15, wherein the temperature is above 120 degrees Celsius.

25. The method of claim 15, wherein the temperature is above 130 degrees Celsius.

* * * * *